United States Patent

[11] 3,634,687

[72] Inventors James H. Somerset
140 Humbert, Syracuse, N.Y. 13224;
Thomas T. Kassal, 19 Cotswold Drive,
Centerport, N.Y. 11721
[21] Appl. No. 45,958
[22] Filed June 15, 1970
[45] Patented Jan. 11, 1972

[54] CASSETTE LOADING AND UNLOADING APPARATUS
8 Claims, 13 Drawing Figs.
[52] U.S. Cl............................................ 250/66,
53/281, 206/62 R, 214/304, 214/309, 220/55 R,
250/68
[51] Int. Cl....................................................... G03c 3/00
[50] Field of Search............................................ 214/304,
309, 17 B; 250/66, 68; 95/14; 53/281

[56] References Cited
UNITED STATES PATENTS
3,150,263 9/1964 Catlin............................ 250/66
3,374,351 3/1968 Sano et al. ..................... 250/66

Primary Examiner—Robert G. Sheridan
Attorney—Pennie, Edmonds, Morton, Taylor and Adams ABSTRACT: Apparatus for loading and unloading film from a cassette comprising a lighttight enclosure having a cassette access opening, a source of unexposed film, said source being in substantially planar alignment with said cassette access opening, means for opening and closing a cassette, and means moving in translation for transferring unexposed film from said source to a cassette and exposed film from a cassette to film-receiving means, said transfer means adapted to pass between the separated portions of a cassette when it is in an open position.

PATENTED JAN 11 1972

INVENTORS
JAMES H. SOMERSET &
THOMAS T. KASSAL

BY
Pennie, Edmonds, Morton, Taylor & Adams
ATTORNEYS

INVENTORS
JAMES H. SOMERSET &
THOMAS T. KASSAL

BY
Pennie, Edmonds, Morton, Taylor & Adams
ATTORNEYS

INVENTORS
JAMES H. SOMERSET &
THOMAS T. KASSAL

INVENTORS
JAMES H. SOMERSET &
THOMAS T. KASSAL

BY
Pennie, Edmonds, Morton, Taylor & Adams
ATTORNEYS

INVENTORS
JAMES H. SOMERSET &
THOMAS T. KASSAL

BY Pennie, Edmonds, Morton, Taylor & Adams
ATTORNEYS

CASSETTE LOADING AND UNLOADING APPARATUS

BACKGROUND OF THE INVENTION

The loading and unloading of X-ray films from cassettes has, heretofore, been carried out manually. This is unsatisfactory because of the time required and the necessity of a darkroom in which to effect such loading and unloading.

Various apparatus has been suggested for the automatic loading and/or unloading of such cassettes. However, these devices have not proven to be successful because they are either cumbersome, excessively complicated so as to require extensive maintenance, or require darkrooms for their proper utilization. It has long been desired to have an apparatus that is not complex, is easily maintained, and which can dispense with the darkroom and conduct all X-ray film-handling operations in daylight. In addition, present methods of extracting the film from the cassette slide the film over the cassette screens, often resulting in scratching of the screen which is extremely undesirable since it can give degraded X-ray images on future films exposed using the cassette.

SUMMARY OF THE INVENTION

A new cassette loading and unloading apparatus has been developed which completely eliminates the need for a darkroom for any X-ray film-handling operations in connection with the cassette, which apparatus is small enough to be used in any size X-ray laboratory and can be combined in modular units, as hereinafter described, to insure operation of the remaining modules should one module be malfunctioning.

The present invention comprises apparatus for automatically loading and unloading cassettes comprising a lighttight enclosure having a cassette access opening, a source of unexposed film, means for receiving exposed film unloaded from a cassette, said source being in substantially planar alignment with said cassette access opening, means for opening and closing a cassette, and means moving in translation for transferring unexposed film from said source to a cassette and exposed film from a cassette to film-receiving means, said transfer means adapted to pass between the separated portions of a cassette when it is in an open position.

DETAILED DESCRIPTION

Figures 1, 2:
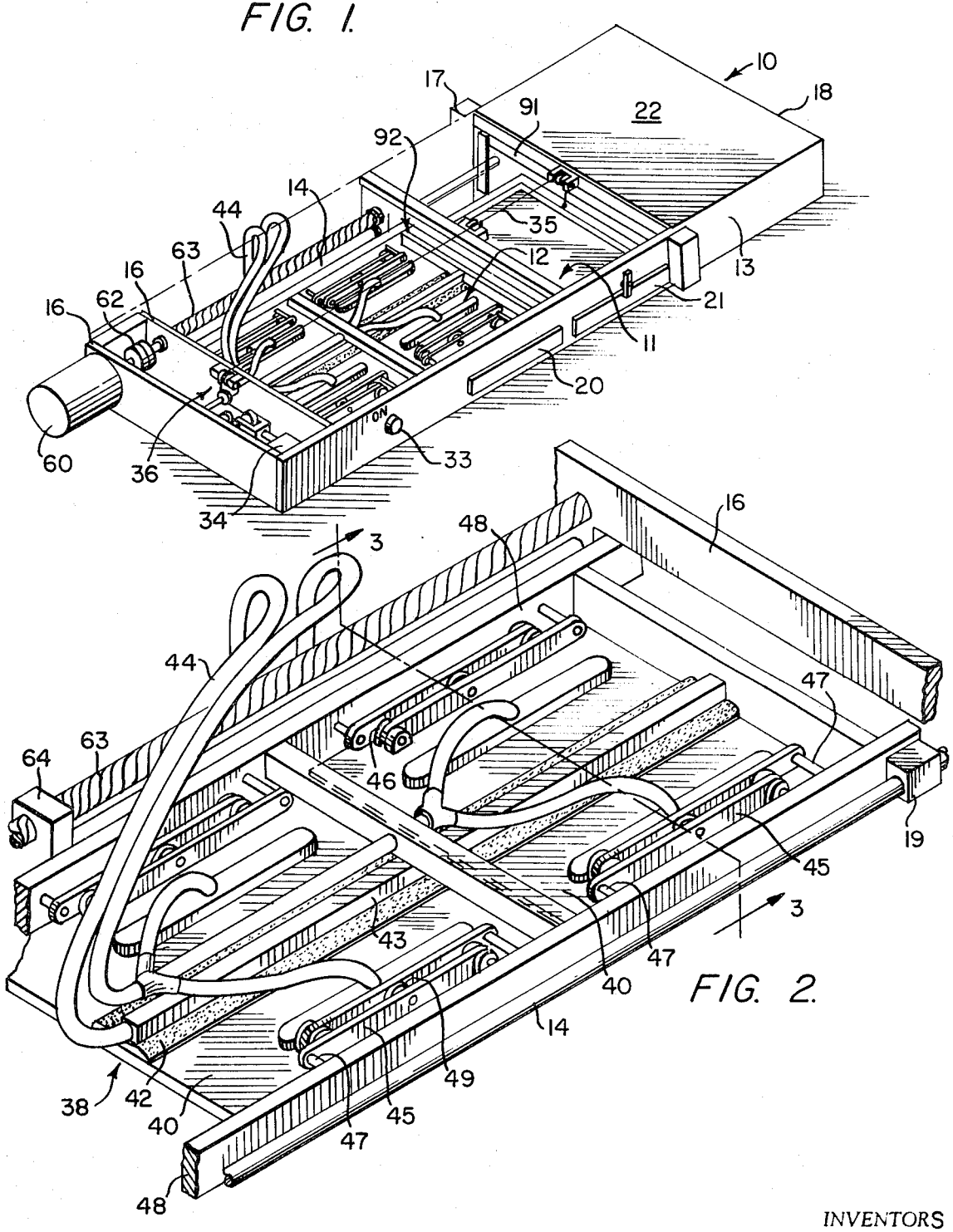
FIG. 1 is a perspective view of the apparatus of the present invention with a portion of he top cover removed to show the interior.
FIG. 2 is an enlarged perspective view of a portion of the apparatus showing the platen arrangement and pickup plates.

Referring to the drawings, the cassette loading and unloading apparatus comprises a lighttight enclosure 10 having a cassette access opening 11 and a magazine access opening 12.

The enclosure 10 comprises side rails 13 running approximately the length of the apparatus, longitudinal guide rods 14, vertical extractor guide rods 15, bulkheads 16, crosspieces 17, and a lighttight case 18. Ball bushings 19, or linear bearings, are mounted on the guide rods 14.

Doors are provided for the cassette access and magazine access openings. Door 20 is to allow the loading of a fresh magazine of film and for unloading a spent magazine and door 21 is for inserting and removing of cassettes. When closed, these access doors are lighttight. At one end of the apparatus, close to a bulkhead, is a rectangular exposed film-receiving enclosure 22. The enclosure 22 in the case connects with a chute (not shown) leading to a processor in which the film is developed. Alternatively, the chute can lead to a suitable lighttight receptacle for retaining the exposed film until such time as it is removed and processed.

Figure 8:
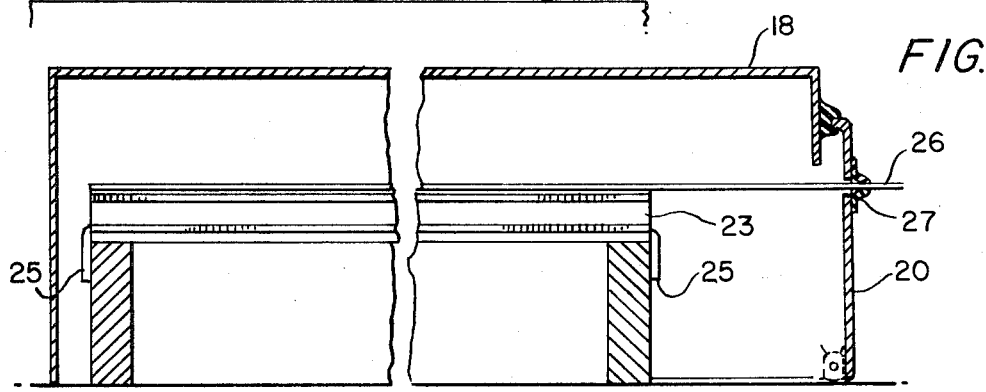
FIG. 8 is a detailed sectional view showing the film magazine in the apparatus.

A magazine 23 (FIG. 8) is inserted through the magazine access door 20 and slides into place along guides as shown hereinafter for the stationary frame of cassette extractor mechanism. After the magazine is inserted, the guides and self-positioning latches 25 hold the magazine in place. To block the passage of light into the magazine during insertion, the magazine is fitted with a lighttight shield 26. As the magazine access door 20 is closed and latched (latch not shown), the end of the light shield is fed through a lighttight slit 27 in the door. Then, the light shield is removed through the slit in the door. The slit 27 is preferably formed of resilient material which prevents light from entering the machine after the light shield has been removed. The machine is now ready for use.

After the fresh film in the magazine has been exhausted, the access door 20 is opened and the empty magazine 23 is removed.

If a malfunction of the machine occurs while it still contains unexposed film, the magazine 23 can be removed by refitting the light shield 26 to the magazine 23 through the light seal 27 in the door 20, and the magazine then removed, or, alternatively, the magazine can be removed by drawing it into a lighttight bag fitted about the magazine access door.

Figure 6:
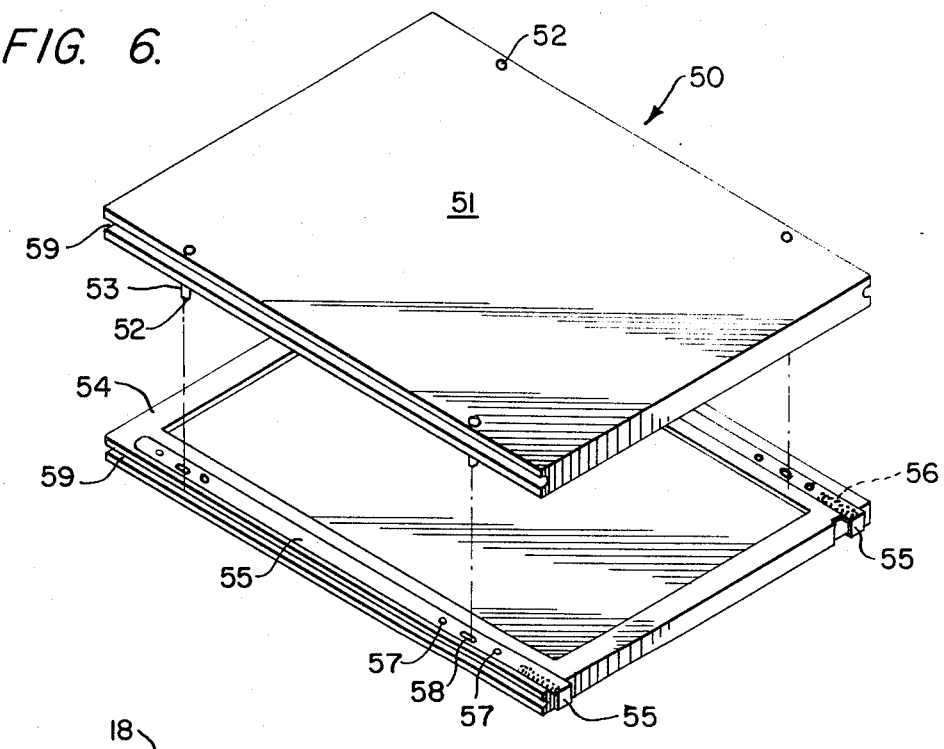
FIG. 6 is an exploded perspective view of a cassette for use in the present invention in its open position.

A cassette 50 for use with the apparatus comprises two pieces both of the usual rectangular cassette shape, best shown in FIG. 6. One piece 51, for ease of reference called the "top" piece, has mounted therein projections 52. The projections 52 have latching grooves 53 and comprise the male parts of the cassette latch mechanism. In the bottom piece 54 of the cassette are mounted the female parts of the latch mechanism which coact with the male parts to dismountably attach the two pieces of the cassette. These female parts comprise bars 55, springs 56, and guide pins 57 and holes 58. The cassette is also provided with engagement channels 59 in the sides of both the top and bottom pieces.

When the cassette pieces are latched together, the projection 52 from the top piece of the cassette enters holes 58 in the edge of the bottom piece of the cassette. The springs 56 cause the latch bars 55 to engage the grooves 53 in projections 52, holding the pieces of the cassette together.

Figure 7:
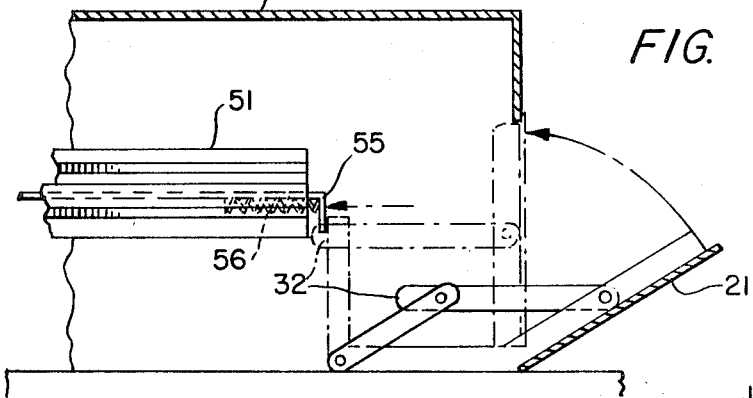
FIG. 7 is a detailed sectional view of the cassette unlatching mechanism.

To unlatch the cassette pieces, the latch bars 55 are pushed against the springs 56, releasing them from their locking position in grooves 53 and allowing the cassette pieces to be separated as shown in FIG. 7.

The cassette 50 containing an exposed X-ray film is inserted through the cassette access door 20 and as the cassette is inserted, the top 51 and bottom 54 parts of the cassette 50 engage the moving frame 28 and stationary frame 29, respectively, of an extractor mechanism. The stationary frame 29 of the extractor mechanism is secured to side rails 13, whereas the moving frame 28 is constrained to a rectilinear motion in a vertical direction; the guides 15 provide the support for the extractor moving frame. The channels 59 in both pieces of the cassette are engaged by pins 31 or other projections in the parts of the extractor.

As the cassette access door 20 is closed and latched, unlatching mechanism 32 connected to the door engages latch bars 55 in the cassette 50, and the cassette is thereby unlatched. The unloading sequence is initiated by pushing the "on" button 33 which activates the control and logic circuit (not shown). Immediately the logic circuit causes a solenoid 34 to be energized causing the moving frame 28 to move along the guides 15, thereby opening the cassette. In the configuration shown, the armature of the solenoid 34 is connected to a cable 35. The cable 35 is threaded through a pulley system 36, thereby allowing the solenoid 34 to be placed remotely from the extractor. The pulley arrangement shown permits a cable motion greater than the armature motion.

After the exposed film in the cassette has been replaced with a fresh film from the magazine, as hereinafter discussed, the solenoid 34 is deenergized, and the extractor returns the cassette to the closed configuration. As the cassette access door 20 is opened the unlatching mechanism 32 is disconnected and the latches 55 in the cassette secure the cassette parts together.

After the cassette is opened, a platen 38 performs a linear translation, its motion being accomplished by the linear motion of ball bushings 19 to which it is connected along the guide rods 14. Pickup plates 40 are attached to the platen 38 and translate therewith, and they also move in vertical translation relative to the platen. The platen 38 is moved linearly as hereinafter described.

On the bottom of each pickup plate are vacuum air channels 41, such that when a pickup foot is in contact with a film, and when a vacuum is applied to the pickup foot, the air is removed through the channels and atmospheric pressure holds the film against the bottom of the pickup foot.

Figure 3:
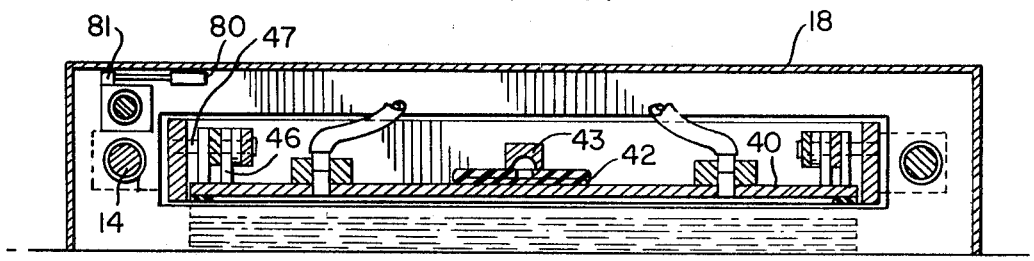
FIG. 3 is a sectional view taken along line 3—3 of FIG. 2.
Figure 4:
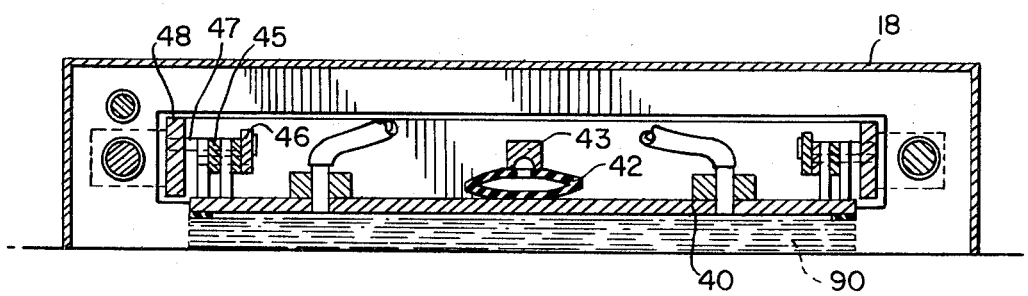
FIG. 4 is the same sectional view as FIG. 3 but with vacuum pickup plate in the lowered film pickup position.
Figure 5:
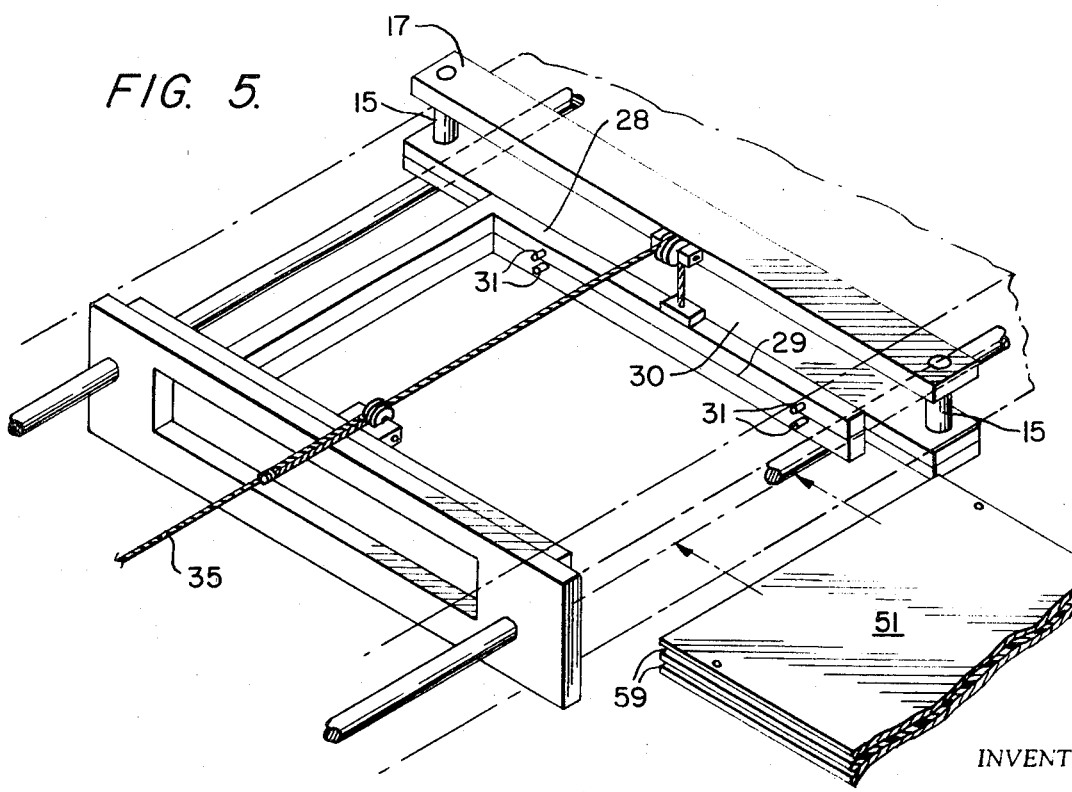
FIG. 5 is an enlarged perspective view of a portion of the apparatus showing the cassette access portion of the apparatus.

The vertical motion of the pickup feet 40 is controlled by actuators 42. The actuators are resilient bags, with one side of the bag secured to the actuator manifold 43, and the other side of the bag secured to the pickup plate. When the interior of the bag is at atmospheric pressure, the bag is limp, and the pickup plate moves downwardly under its own weight, as shown in FIG. 4. When a vacuum is applied to the bag, the bag (actuator) assumes a flat shape, and the pickup plate is raised, as shown in FIG. 3. Thus, to raise or lower a pickup plate, an actuator vacuum valve is either energized or deenergized to control the flow of air to the pickup foot.

The pickup actuators 42 are connected to the manifold 43, and the manifold is connected to a source of vacuum (not shown) by a flexible hose 44. The flexible hose allows the platen to move while retaining the vacuum connection.

The motion of the plates 40 is guided by four lever arms 45. One end of each lever arm is pinned to projections 46 on the top of the plate, whereas the other end of each lever arm is pinned to swing arm shafts 47. The swing arm shafts are secured to the side pieces 48 of the platen.

Near the midpoint of each lever arm, a pin joins the lever arms through a spacer 49. Each pinned joint comprises a pivot wherein a certain clearance is present between the pin and its mating bearing surface. Owing to the clearance in the joints, the pickup plate can move up and down, and the motion will be nearly a pure translation (differing from pure translation only by an amount approximately equal to the clearance in the pinned joints).

The drive mechanism for the apparatus comprises a motor 60, a coupling 61, a brake 62, lead screw 63, lead screw nut 64, ball bearing 65, and a rotator 66. The capture mechanism comprises the solenoid 68, solenoid plunger 69, plunger end piece 70, and springs 71.

The operation of the apparatus described herein is controlled by a conventional logic circuit which forms no part of the instant invention. Thus, the use of cam actuated microswitches, solenoids, and motor and other conventional control devices as described herein, are used to drive, synchronize and correlate the operations of the apparatus described herein. These control elements are wired together in the usual manner so as to perform the sequence of steps set forth.

As to the drive mechanism, upon activation by pressing the "on" button 33 the drive motor 60 is energized, causing the lead screw 63 to rotate (the coupling 61 serves to connect the motor 60 to the lead screw 63). The lead screw nut 64 is secured to the platen and the rotation of the lead screw 63 causes the nut 64 and platen 38 to move in translation. As the platen approaches the predetermined position in which it is to be stopped, the motor is deenergized when microswitch 80 is contacted by the cam 81 on lead screw nut and the brake 62 is energized, thereby stopping the rotation of the lead screw, and bringing the platen 38 to rest, momentarily, close to its desired position. The brake is then released, and the capture mechanism positions the platen 38 precisely.

The capture mechanism rotator 66 secured to the rotating shaft 67 of the lead screw is in an at-rest position when the plunger end piece 70 of the capture mechanism is held by springs 71 against the rotator 66, and causes the rotator to be positioned vertically. To allow the lead screw 63 to rotate, the solenoid 68, when energized, causes the solenoid armature to move, and with it the plunger 69 slides and the solenoid thereby pulls the plunger 69 away from the rotator 66, and frees the rotator 66. After the brake 62 has brought the lead screw 63 to rest, the rotator 66 will be nearly, but not necessarily exactly, vertical. This vertical position is one predetermined to assure proper positioning of the platen 38. When the solenoid 68 is deenergized, the tension springs 71 cause the plunger 69 to return to the at-rest position, thereby moving the rotator 69 to the vertical position.

Thus, the "on" switch 33 activates the logic circuit, the motor 60 and solenoid 68 are energized, causing the lead screw 63 to rotate and the platen to move in translation. When the platen is near its desired position, a cam 81 on the platen engages a microswitch 80, providing a signal to the logic circuit. The logic circuit then causes the motor 60 to be deenergized and the brake 62 to be energized while keeping the solenoid 68 energized. The brake 62 causes the lead screw 63 to come to rest within about three-fourths of a turn of the lead screw.

The logic circuit then causes the brake 62 and the solenoid 68 to be deenergized, thereby allowing the plunger to move the rotator 66 to the vertical position.

The operation of the apparatus is evident from the foregoing description and comprises inserting a cassette 50 into the enclosure 10 through access door 21. As the cassette 50 is inserted, the upper half of the cassette enters the movable frame 28 of the cassette opening and closing means and the lower half of the cassette is fixed to the stationary portion of the frame 29. As the cassette access door 21 is closed, the unlatching mechanism 32 thereon engages and releases the latches 55 of the cassette 50. A magazine 23 containing unexposed film has previously been inserted into the enclosure through access door 20.

After the cassette 50 has been inserted and the door 21 closed, the "on" button 33 is pushed. This activates solenoid 34 and causes the movable frame 28 to move in a vertical path separating the top and bottom pieces of the cassette. When the frame 28 has reached its uppermost position, motor 60 is energized causing lead screw 63 to rotate and drive the platen 38 and to position it so that the frontmost plate 40 in the direction of travel of platen 38 is between the top and bottom pieces of the cassette 50 and the rearmost plate 40 overlies magazine 23 containing unexposed film 90. The plates 40 are then lowered and vacuum applied so that the frontmost plate picks up the exposed film from the opened cassette and the rearmost plate picks up unexposed film 90 from the magazine. The plates 40, still holding their respective films, are then retracted and the platen advanced one more station.

Once again, positioning of the platen is accomplished by cam 81 on lead nut activating a microswitch 80. This causes, as described above, a deenergizing of motor 60 and operation of the capture mechanism to properly position the platen 38. After this second advance of the platen is complete, the plates 40 are again lowered, and the vacuum is released. The exposed film then drops from the frontmost plate into a developing machine (or alternatively into a lighttight tray in the film-receiving enclosure 22) and the fresh film is deposited by the rearmost plate into the opened cassette.

After depositing the exposed and unexposed sheets of film into their respective locations, the platen moves back to its original position. The cassette 50 can now be removed and, if desired, the exposed film can be withdrawn from the lighttight tray for developing.

A movable light shield 91 and a stationary light shield 92 insure that when the cassette access door 21 is opened, only the cassette insertion space is exposed to light, and the remainder of the machine remains lighttight.

Figure 9:
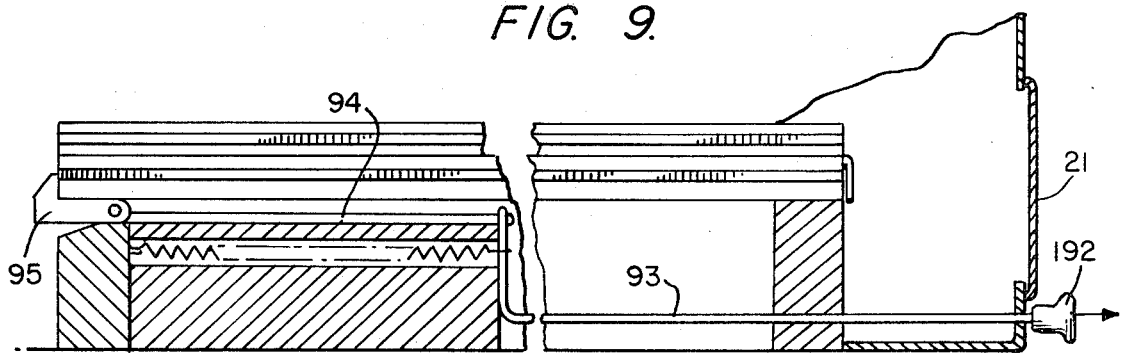
FIG. 9 is a sectional view showing the means for releasing a cassette from the apparatus.

The cassette 50 is ejected from the enclosure by means of an ejector assembly shown in FIG. 9, which comprises a knob 192 which protrudes from the side of the machine and which is affixed to a spring-biased ejector rod 93. The ejector rod 93 is connected to a plunger 94 which in turn is affixed to hook 95. After the cassette has been loaded with unexposed film, the door is opened and knob 93 pulled, thereby ejecting the cassette 50 from the machine.

Figure 10:
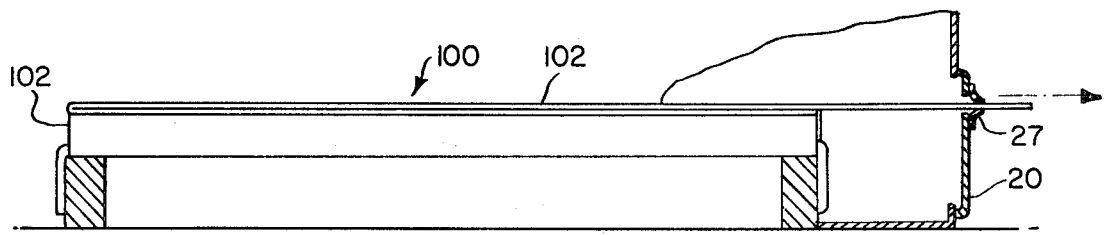
FIG. 10 is a sectional view of a modified film magazine.
Figure 11:
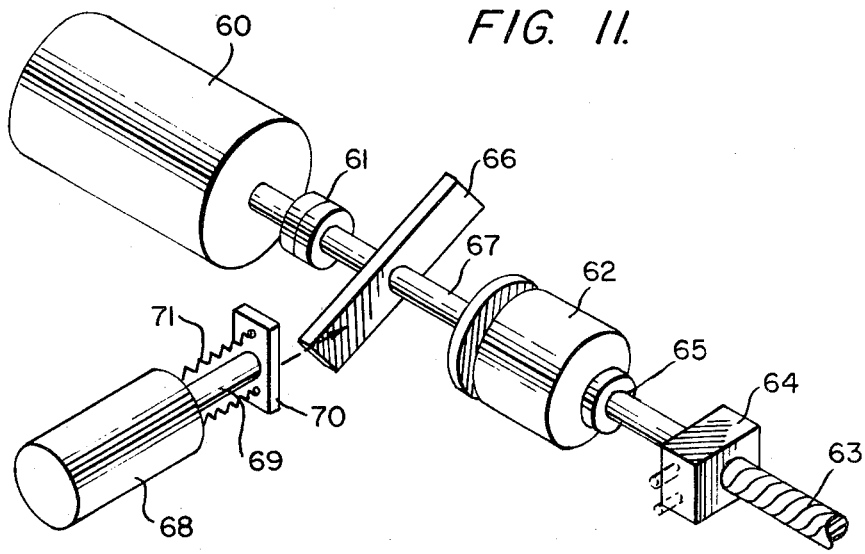
FIG. 11 is a detailed schematic view of the capture mechanism.
Figure 12:
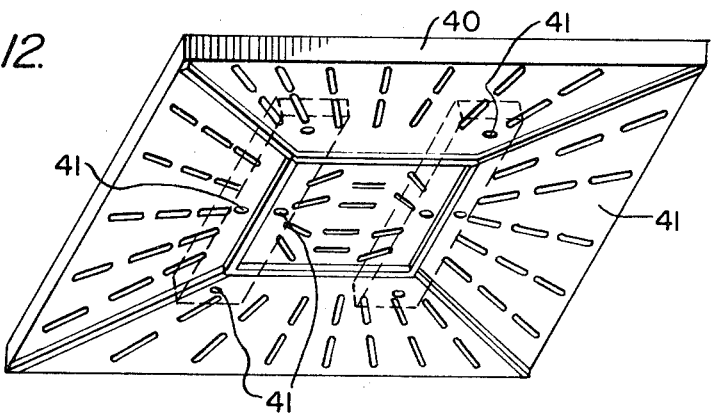
FIG. 12 is a perspective view of the bottom of the pickup feet.

There is shown in FIG. 10 an alternate embodiment of a film magazine 100. This magazine also has grooves on at least two parallel sides similar to the grooves in the cassette. As the magazine is inserted, the grooves engage tracks fixed to the frame of the machine. The purpose of the grooves and tracks is to hold the magazine firmly in place within the machine.

The magazine comprises a lighttight case 101, preferably of plastic having a removable cover 102. The magazine is inserted into the machine with the cover 102 affixed, and the magazine access door 20 is closed and latched.

The removable lighttight cover is sealed to the magazine along one surface of the case. The cover is "doubled over" so that the free end thereof extends outside the door 20 through which the magazine 100 was inserted. When the door is closed, the end of the cover is led through the lighttight slit 27. After the door is latched, the cover is removed by pulling on the protruding end of the cover.

Figure 13:
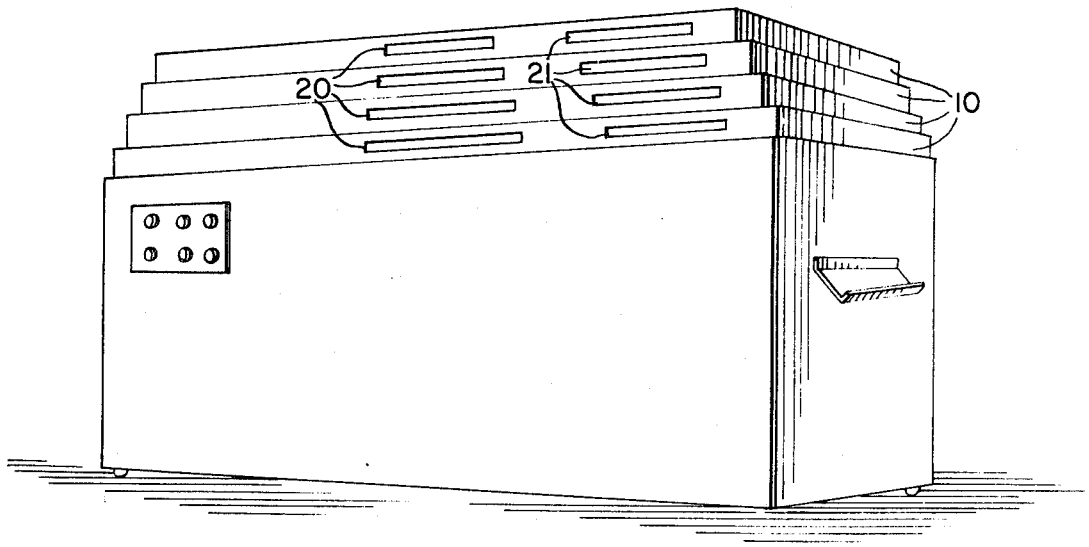
FIG. 13 is a perspective view of a modular embodiment of the present invention.

The apparatus of the present invention is particularly useful in that it can be combined into modular assembly as shown in that it can be combined into modular assembly as shown in FIG. 13. Each individual module of the assembly has the structure described above but each module is connected to one logic circuit and one vacuum supply. Also each module can be made to accept a different size cassette. Using this modular concept, the malfunction of one module does not incapacitate the other modules in the set. In addition, the malfunctioning module can be removed for repair away from the assembly or a functioning unit used to replace it. This is an obvious advantage over present cassette loaders and unloaders wherein all sizes of cassettes are handled in one unit and malfunctioning of such unit prevents use of the unit for any size cassette.

As to materials of construction, they can be any of those, such as metal, wood and plastic, conventionally used to manufacture equipment.

It will be understood that it is intended to cover all changes and modifications of the invention herein chosen for the purpose of illustration which do not constitute departures from the spirit and scope of the invention.

What is claimed is:

1. Apparatus for automatically loading and unloading film cassettes comprising a lighttight enclosure having a cassette access opening, unexposed film containing means in said enclosure being in substantially horizontal planar alignment with said access opening, means in line with said access opening for opening and closing a cassette, and transfer means moving in linear translation for transferring unexposed film from said film-containing means to a cassette and exposed film from a cassette, said transfer means adapted to pass between separated portions of a cassette when it is in an open position.

2. The apparatus of claim 1 including an access opening in said enclosure in line with said unexposed film-containing means and a closure for said opening having a lighttight slit therein.

3. The apparatus of claim 2 wherein said transfer means comprise a horizontally movable platen and film pickup and deposit means carried by said platen.

4. The apparatus of claim 1 including means in said enclosure for receiving exposed film unloaded from a cassette.

5. The apparatus of claim 4 wherein said transfer means comprise a horizontally movable platen and film pickup and deposit means carried by said platen.

6. The apparatus of claim 4 wherein said film pickup and deposit means comprise two means for moving the plates concurrently in vertical translation relative to said platen, and means for correlating the linear translation of said platen and the vertical translation of said plates.

7. Apparatus for automatically loading and unloading film cassettes comprising the combination of a cassette having separable portions permitting access to the interior thereof for loading unexposed film therein and unloading exposed film therefrom, and a lighttight enclosure having a cassette access opening, an unexposed film containing magazine in said enclosure being in substantially horizontal planar alignment with said access opening, means in said enclosure in line with said access opening for separating and reuniting said portions of said cassette, and transfer means moving in linear translation for removing exposed film from said cassette and transferring unexposed film from said magazine to said cassette, said transfer means adapted to pass between said separable portions of said cassette.

8. The apparatus of claim 7 wherein said transfer means comprise a platen and vacuum actuated film pickup means carried by said platen.

* * * * *

UNITED STATES PATENT OFFICE
CERTIFICATE OF CORRECTION

Patent No. 3,634,687     Dated January 11, 1972

Inventor(s)

It is certified that error appears in the above-identified patent and that said Letters Patent are hereby corrected as shown below:

Column 1, line 46, "he" should be --the--.

Column 5, cancel line 41 which comprises "that it can be combined into modular assembly as shown in".

Column 6, line 23 (Claim 3), "2" should be --1--.

Signed and sealed this 11th day of July 1972.

(SEAL)
Attest:

EDWARD M. FLETCHER, JR.
Attesting Officer

ROBERT GOTTSCHALK
Commissioner of Patents